United States Patent [19]

Matsuo

[11] Patent Number: 4,551,582
[45] Date of Patent: Nov. 5, 1985

[54] CIRCUIT FOR AUTOMATICALLY RELEASING HOLDING STATE OF TELEPHONE SYSTEM

[75] Inventor: Nobuo Matsuo, Kawasaki, Japan
[73] Assignee: Nitsuko Limited, Kanagawa, Japan
[21] Appl. No.: 595,387
[22] Filed: Mar. 30, 1984
[30] Foreign Application Priority Data Nov. 28, 1983 [JP] Japan .................... 58-221966

[51] Int. Cl.$^4$ ............................................ H04M 1/00
[52] U.S. Cl. ................................................. 179/81 R
[58] Field of Search ................. 179/81 R, 84 R, 99 H

[56] References Cited
U.S. PATENT DOCUMENTS 4,454,385  6/1984  Grantland et al. ............... 179/81 R Primary Examiner—James L. Dwyer
Attorney, Agent, or Firm—Burns, Doane, Swecker & Mathis

[57] ABSTRACT

An automatic telephone hold releasing circuit for a plurality of telephone sets connected in parallel across a pair of wires of a subscriber's office line, which can automatically release a call placed on hold at one of the telephone sets even when the particular telephone set is on hold with its handset placed in the on-hook position. The circuit comprises means for detecting a voltage drop occurring in the voice-circuit when the handset of a telephone set other than that with which the call has been initially answered is unhooked, means for comparing the dropped voltage with a voltage present when the call was put on hold, and means responsive to an output of said comparing means for deenergizing a relay to open its contacts in response to the voltage drop and automatically release the initially answered telephone set.

8 Claims, 1 Drawing Figure

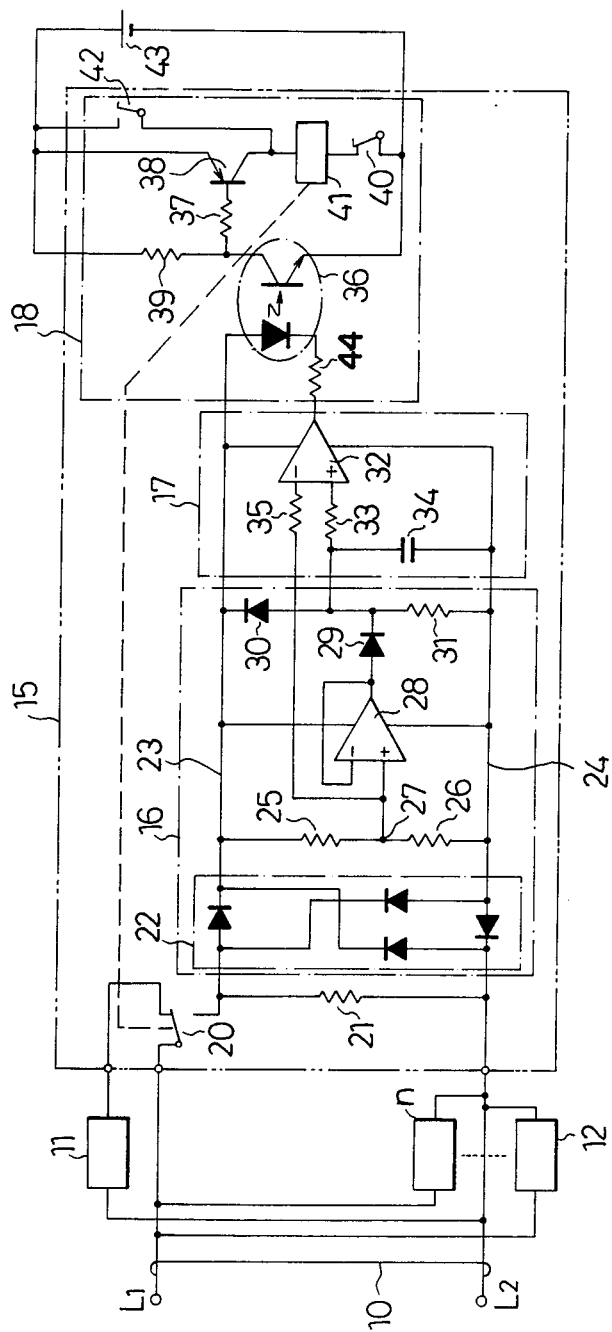

CIRCUIT FOR AUTOMATICALLY RELEASING HOLDING STATE OF TELEPHONE SYSTEM

This invention relates to an automatic telephone hold releasing circuit and, more specifically, to a circuit which automatically releases holding state of a branch telephone system in which a plurality of telephone sets are connected in parallel across a single subscriber's line.

The branch telephone system in which main and additional telephone sets installed at separate locations are connected in parallel across a pair of wires forming the subscriber's line is known in general. In the event where, for example, two telephone sets of this system are respectively installed on each of two different floors of a subscriber's house, it often occurs that an incoming call is answered initially with one of the sets but the conversation is intended to be continued later with the other set on the other floor. This can be achieved by keeping the initially answered telephone set on hold with its handset unhooked and picking up the handset of the other telephone. With such a system, however, after finishing the conversation with the other telephone set and placing its handset back on the hook, the subscriber's line is kept on hold until the handset of the initially answered telephone set is put back to its on-hook position thereby preventing any new incoming calls until the handset of the first telephone set is hung up. In this way, the branch telephone system of the known type has been defective particularly when the subscriber's family uses mainly a restricted house area, and the conversation through one telephone set could be easily subjected to eavesdropping through another telephone set.

In order to avoid these problems, another system known as a key telephone system performing multiple functions has been suggested. This system can be selectively connected to one or more central office lines and includes a plurality of key telephone sets each having many keys arranged on its operating face and operable through a main control unit, so as to achieve various functions of holding an answered incoming call, even with the handset in its on-hook position. This system permits inter-extension calls between the respective telephone sets which are interconnected with each other through the main unit, and so on, in addition to ordinary call and answer functions with respect to incoming and outgoing calls. Although this system can satisfactorily solve the problems involved in the foregoing branch telephone system, it has the disadvantage that it requires many complex and expensive circuit parts which make the system considerably expensive.

A primary object of the present invention is, therefore, to provide an automatic hold releasing circuit which is applicable to the branch telephone system so that an incoming or outgoing call through one of the telephone sets connected in parallel across a single subscriber's line can be placed on hold, even with the handset on-hook, to permit the conversation to continue through another telephone set, and the hold state can be automatically released when the handset of the other telephone set is picked up to continue the conversation.

Another object of the present invention is to provide a relatively inexpensive automatic hold releasing circuit which is attached to at least a main telephone set of the branch telephone system to allow the handset of the main telephone set to be hung up immediately after initially answering an incoming call and placing the call on hold, so as to avoid the necessity of keeping the main telephone set in an off-hook condition.

A further object of the present invention is to improve the usefulness of the well known branch telephone system simply by attaching thereto a relatively inexpensive automatic hold releasing circuit capable of avoiding the problems of prior systems and adapting the system to a variety of uses at a lower cost.

Other objects and advantages of the present invention shall become clear from the following description of the invention detailed with reference to a preferred embodiment illustrated in the accompanying drawing, which is a circuit diagram of an automatic telephone hold releasing circuit according to the present invention.

While the present invention shall now be described with reference to the embodiment shown in the drawing, it should be understood that the intention is not to limit the invention only to the particular embodiment but rather to cover all alteration, modifications and equivalent arrangements possible within the scope of the appended claims.

Referring to the drawing, a plurality n of telephone sets are connected in parallel across a pair of cables $L_1$ and $L_2$ of a subscriber's line 10 for brevity of explanation, reference shall be made to the case where a pair of telephone sets 11 and 12 are connected in parallel in the form of branch telephone system. The telephone set 11 is provided with an automatic hold state releasing circuit 15 according to the present invention which comprises a voice-circuit voltage detecting section 16, voltage comparing section 17 and relay driving section 18.

More specifically, the cable $L_1$ is connected at its terminal end to a movable contact of relay switch 20, described in detail with the relay driving section 18, and the telephone set 11 is connected between a connecting terminal of the other cable $L_2$ and a break side of fixed switch of the relay contacts 20. Between a make side of the fixed contacts and the connecting terminal of the cable $L_2$, a line seizing resistor 21 is connected in parallel to a resistor (not shown) provided as has been known within the telephone set 12. A diode bridge rectifier circuit 22 provided in the voltage detecting section 16 is connected across the resistor 21, and voltage dividing resistors 25 and 26 for voltage monitoring are connected in series between rectifier circuit output lines 23 and 24. Junction point 27 between the voltage dividing resistors 25 and 26 is connected to a noninverting input terminal of an amplifier 28 connected between the lines 23 and 24, and an output terminal of the amplifier 28 is connected to its own inverting input terminal and also to a reverse-current preventing diode 29. The cathode of the diode 29 is connected to a point between a diode 30 and a resistor 31 connected in series between the lines 23 and 24.

The junction between the diode 30 and the resistor 31 is also connected through a resistor 33 to a noninverting input terminal of a comparator 32 provided in the voltage comparing section 17 connected between the lines 23 and 24. The inverting input terminal of the comparator 32 is connected through a resistor 35 to the junction point 27 between the voltage dividing resistors 25 and 26. The comparator 32 is connected at its output terminal to a resistor 44, and a light emitting diode in a photocoupler 36 in the relay driving section 18 is connected between the resistor 44 and an extended end of the line 23. A phototransistor in the photocoupler 36 is connected at its collector through a resistor 37 to the base of a transistor 38 for relay-drive control and also at the collector to the emitter of the transistor 38 through a resistor 39. The emitter of the phototransistor is connected to the movable contact side of a reset switch 40, which in turn is connected on its fixed contact side to the collector of the transistor 38 through a relay 41 which comprises the contacts 20.

Further, a holding pushbutton switch 42 of non-lock type is connected between the collector and the emitter of the transistor 38, and a power source 43 is inserted between a connecting point of the switch 42 to the emitter of the transistor 38 and a connecting point of the reset switch 40 to the emitter of the phototransistor.

While in the foregoing the automatic hold releasing circuit has been referred to as attached to the telephone set 11, it should be readily understood by those skilled in the art that one or more of the releasing circuits may be attached to any one or more of the n telephone sets connected in parallel across the cables $L_1$ and $L_2$ of the subscriber's line 10. Additionally, the releasing circuit may be incorporated directly in the telephone set or housed in a separate casing which is connected to the telephone set.

The operation of the automatic hold releasing circuit according to the present invention shall be explained with reference to the illustrated embodiment.

When, for example, an incoming call takes place, the subscriber unhooks a handset of the telephone set 11 to answer the call and thereafter depresses the holding pushbutton switch 42 which is interlocked with the relay driving section 18. This causes a source current to flow through a circuit from the power source 43, reset switch 40, relay 41, switch 42 and back to the source 43, which energizes the relay 41 to switch its contacts over to the contact make position, i.e., a movable contactor which has been on the break side fixed contact of the switch 20 comes into contact with the make side fixed contact in the relay 41, whereby a circuit is completed through the cable $L_1$ of the line 10, make side fixed contact, line seizing resistor 21 and cable $L_2$, thereby to seize the line and keep it on hold.

On the other hand, a voltage from the subscriber's line is applied to the rectifier circuit 22 in the voice-circuit voltage detecting section 16, and the resistors 25 and 26 divide an output of the circuit 22 and provide divided-voltage output from the junction point 27 to the amplifier 28, an output of which is provided through the diode 29 and resistor 33 to the noninverting input terminal of the comparator 32 in the voltage comparing section 17. Since the comparator 32 is also connected at its inverting input terminal to the junction point 27 of the voltage dividing resistor 25 and 26 in the voltage detecting section 16, the divided-voltage output from the junction point 27 is applied as a reference voltage, so that the inverting input terminal of the comparator 32 becomes higher in potential than the noninverting input terminal. This causes the comparator 32 to have a low level output and the light emitting diode of the photocoupler 36 turns ON. Emitted light from the light emitting diode strikes the phototransistor causing it to conduct, causing the relay-drive control transistor 38 of the relay driving section 18 to become conductive, whereby the relay 41 is continuously energized to maintain the contact make state of the switch 20 in the relay 41. Thus, the hold state of the incoming call signal is continued so long as the subscriber does not unhook the other telephone set 12 through which he intends to continue the conversation.

When the subscriber unhooks the other telephone set 12, the resistance incorporated in the telephone set 12 and the line seizing resistor 21 in the releasing circuit are connected in parallel in the line seizing circuit, and the potential of the line seizing circuit drops or, in other words, the voltage applied to the voice-circuit voltage detecting section 16 drops, so that the divided-voltage output at the junction 27 of the resistors 25 and 26 will also drop and the reference voltage input to the inverting input terminal of the comparator 32 will be lowered. On the other hand, during the foregoing hold state of the incoming call signal, a capacitor 34 inserted in the voltage comparing section 17 is being charged with the voltage of a level at the time of the holding and, upon the drop of the divided-voltage output at the junction 27, the charge in the capacitor 34 is discharged to the noninverting input terminal of the comparator 32. Reverse flow of current from the discharging capacitor 34 into the voltage detecting section 16 is prevented by means of the diode 29. If the value of the line seizing resistor 21 is preliminarily selected to be proper for rendering the potential of the divided-voltage at the junction 27 to be lower than the potential of the discharge from the capacitor 34 to the noninverting input terminal of the comparator 32, then the potential at this terminal of the comparator becomes higher than that at the inverting input terminal. Therefore, the output of the comparator 32 goes high and the light emitting diode of the photocoupler 36 is turned OFF, whereby the phototransistor as well as the transistor 38 become non-conductive.

Consequently, the relay 41 of the relay driving section 18 returns to its original break position illustrated in the drawing so that, notwithstanding the on-hook condition of the telephone set 11 with the holding pushbutton switch 42 actuated, the holding state of the telephone set 11 will be automatically released.

Further, when the subscriber intends to continue the conversation or with the same telephone set 11 through which the call was initially answered and placed on hold, rather than the other set 12, he simply actuates the reset switch 40 connected in series with the relay 41 to restore its contacts 20 to the initial break position and release the hold state. That is, the hold state can be manually released.

According to the automatic telephone hold releasing circuit of the present invention as arranged as has been disclosed, it is unnecessary to keep the initially answered telephone set for the purpose of holding the line and, even after being placed on hold, the call can be immediately released upon initiation of continued conversation with another one of the telephone sets connected in parallel to each other. Accordingly, the problems which have been involved in the known branch telephone system can be effectively eliminated with the circuit of a simple and inexpensive arrangement, while remarkably improving the usefulness and adaptability to many uses of the system.

What is claimed as my invention is:

1. An automatic hold releasing circuit for use in a branch telephone system including a plurality of telephone sets connected in parallel across a pair of wires of a subscriber's line, comprising:

switching means for selectively connecting said subscriber line wires with either a line seizing resistor in order to place the subscriber's line on hold or with one of said plurality of telephone sets;

voltage detecting means for continually providing an output indicating the voltage across the subscriber's line wires;

voltage comparing means for continually comparing the voltage across the subscriber's line wires after said line was placed on hold with the voltage across the subscriber's line wires at the time the live was initially placed on hold by said switching means, thus to detect a drop in voltage across said wires in order to provide an output indicating that any of said telephones connected in parallel other than said one telephone has been taken off-hook; and said switching means including a switching element and switch driving means, said switch driving means selectively actuating said switching element to thereby connect said line seizing resistor between said subscriber line wires, and deactuating said switching element to disconnect said line seizing resistor in response to the output from said voltage comparing means, thereby to release said subscriber's line from hold.

2. A circuit according to claim 1, wherein said switching element includes a relay having a movable contact connected to one of said subscriber's line wires, a fixed break contact connected to said one telephone set and a fixed make contact connected to said line seizing resistor, and said switch driving means includes means for selectively energizing said relay to actuate said switching element and deenergizing said relay to deactuate said switching element.

3. A circuit according to claim 2, wherein said detecting means comprises a rectifying circuit connected to said line seizing resistor, voltage dividing resistors connected to output ends of said rectifying circuit and an amplifier receiving an output from a junction of said voltage dividing resistors.

4. A circuit according to claim 3, wherein said amplifier is connected at its output end to a reverse current preventing diode, and said comparing means comprises a comparator for receiving through said diode an output from said amplifier, and said output from said junction of said voltage dividing resistors, and a capacitor charged by said output of the amplifier through said diode and dischargeable toward said comparator.

5. A circuit according to claim 4, wherein said means for energizing and deenergizing said relay comprises a photocoupler turned ON and OFF in response to an output of said comparator, and a transistor connected to said relay and turned ON and OFF in response to said ON and OFF operations of said photocoupler.

6. A circuit according to claim 2, wherein said relay is energized by a hold pushbutton switch connected to a power source.

7. A circuit according to claim 6, wherein said relay is adapted to be deenergized by a reset pushbutton switch connected to said power source.

8. An automatic hold releasing circuit for use in a branch telephone system including a plurality of telephone sets connected in parallel across a pair of wires of a subscriber's line, comprising:

switching means for selectively connecting said subscriber line wires with either a line seizing resistor in order to place said subscriber's line on hold or with one of said plurality of telephone sets;

voltage detecting means including a rectifier circuit connected in parallel with said line seizing resistor for providing an output on a pair of output lines indicating the voltage across the subscriber line wires, a voltage divider network including at least two resistors connected in series across said output lines of said rectifier circuit, and an amplifier receiving an input from a junction between the resistors of said voltage divider network, said amplifier having an output terminal connected to a second input to said amplifier;

voltage comparing means including a charge storage capacitor for storing a charge representative of the voltage level across the subscriber line wires when the line is placed on hold and a comparator having one input from said junction of said voltage divider network and a second input from said charge storage capacitor, said comparator operative to compare the voltage at said junction with the stored charge on said charge storage capacitor in order to detect a decrease in voltage across said subscriber line wires, thus providing an output indicating that any one of said telephones connected in parallel other than said one telephone has been taken off-hook; and said switching means including a relay and relay driving means, said relay driving means energizing said relay to thereby connect said line seizing resistor between said subscriber line wires in response to closing of a subscriber actuable switch, and deenergizing said relay to disconnect said line seizing resistor in response to the output from said comparator, thereby to release said subscriber's line from hold.

* * * * *